(12) United States Patent
Kita

(10) Patent No.: US 7,382,502 B2
(45) Date of Patent: Jun. 3, 2008

(54) IMAGE PROCESSING METHOD AND APPARATUS FOR RECOVERING READING FAULTS

(75) Inventor: Koji Kita, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 1014 days.

(21) Appl. No.: 10/789,057

(22) Filed: Feb. 27, 2004

(65) Prior Publication Data

US 2004/0240751 A1  Dec. 2, 2004

(30) Foreign Application Priority Data

Feb. 28, 2003  (JP)  ............................. 2003-053464

(51) Int. Cl.
H04N 1/04 (2006.01)
(52) U.S. Cl. ................. 358/474; 358/475; 358/486; 358/500; 358/437; 358/448; 382/274; 382/254; 382/163; 382/282; 382/167
(58) Field of Classification Search ........... 358/448, 358/461, 452, 453, 462, 475, 509, 486, 437, 358/500; 382/149, 163, 162, 254, 274, 282, 382/283, 167; 348/96; 250/208.1
See application file for complete search history.

(56) References Cited

U.S. PATENT DOCUMENTS

| | | | | |
|---|---|---|---|---|
| 4,977,521 A | * | 12/1990 | Kaplan | 382/254 |
| 5,266,805 A | * | 11/1993 | Edgar | 250/330 |
| 6,496,286 B1 | * | 12/2002 | Yamazaki | 358/514 |
| 7,292,379 B2 | * | 11/2007 | Yamaguchi | 358/518 |
| 2002/0048411 A1 | | 4/2002 | Takatama et al. | |
| 2002/0054694 A1 | * | 5/2002 | Vachtsevanos et al. | 382/111 |
| 2002/0106134 A1 | * | 8/2002 | Dundon et al. | 382/274 |
| 2002/0140992 A1 | * | 10/2002 | Konagaya | 358/461 |
| 2003/0012453 A1 | | 1/2003 | Kotlikov et al. | |
| 2003/0039402 A1 | | 2/2003 | Robins et al. | |
| 2003/0127597 A1 | * | 7/2003 | Nakamura et al. | 250/341.1 |

FOREIGN PATENT DOCUMENTS

| | | |
|---|---|---|
| JP | 2000-34968 | 12/2000 |
| JP | 2000-341473 | 12/2000 |
| JP | 2001-078038 | 3/2001 |

* cited by examiner

Primary Examiner—Aung S. Moe
Assistant Examiner—Negussie Worku
(74) Attorney, Agent, or Firm—Fulbright & Jaworski LLP

(57) ABSTRACT

An image processing apparatus for recovering reading faults produced in time of scanning photographic film due to imperfections present on the film such as scratches, dust or stains. The apparatus comprises a defective pixel detecting unit (11) for detecting defective pixels influenced by the imperfections, an interpolating unit (12) for performing an interpolating process for the defective pixels to create corrected pixel values for the defective pixels, a standard deviation calculating unit (13) for calculating standard deviations of pixel values forming image data, and determining granularity of an input image based on the standard deviations, and a graininess adding unit (14) for adding a value obtained by multiplying the granularity by a random number to the corrected pixel values for each defective pixel.

10 Claims, 5 Drawing Sheets

IMAGE PROCESSING METHOD AND APPARATUS FOR RECOVERING READING FAULTS

RELATED APPLICATION

Applicant hereby claims priority to Japanese Patent Application No. 2003-53464, filed on Feb. 28, 2003, which is incorporated herein by reference in its entirety.

BACKGROUND OF THE INVENTION

1. Field of the Invention

This invention relates to an image processing technique for recovering reading faults in digital image data read from an image recording medium by a scanner or the like, such faults being due to imperfections present on the image recording medium such as scratches, dust, stains and the like.

2. Description of the Related Art

Printers for capturing images recorded on photographic film serving as an image recording medium and outputting the images on printing paper include analog printers and digital printers. An analog printer exposes printing paper by using light transmitted through images on photographic film. A digital printer acquires, by means of a scanner or the like, digital image data (hereinafter called "image data") from light transmitted through images on photographic film, and exposes printing paper based on this image data. The image data here consists of a plurality of pixels arranged in a matrix. Each pixel has a pixel value of each basic color (e.g. R, G and B), and also a pixel value of infrared light where infrared light also is used.

With both analog and digital printers, when the photographic film has scratches, dust or stains (hereinafter collectively called "imperfections"), the images printed on the printing paper have faults such as density variations or deficiencies. Conventionally, therefore, in order to ease such faults, both analog and digital types use diffused light for transmission through photographic film. Furthermore, the digital printer can eliminate influences of the above imperfections from the image data by putting the image data to image processing. For this aspect, reference may be made to the following patent documents: Japanese Unexamined Patent Publication H6-28468 (corresponding U.S. Pat. No. 5,266,805), Japanese Unexamined Patent Publication 2000-341473, Japanese Unexamined Patent Publication 2000-349968, and Japanese Unexamined Patent Publication 2001-157003 (corresponding U.S. publication US2003127597A).

The image processing for eliminating influences of the above imperfections, i.e. image processing for recovering faults due to the above imperfections in digital image data read, will be described. First, infrared light is transmitted through photographic film. The infrared light is scattered by the above imperfections on the photographic film, but is not easily influenced by an image recorded on the photographic film. Therefore, infrared image data obtained by a scanner or the like that reads the infrared light transmitted through the photographic film includes mainly information about the imperfections. In the input image, pixels influenced by the above imperfections tend to have low pixel values of infrared light (luminance signal values based on the infrared light; hereinafter infrared pixel values). Thus, the pixels with relatively low infrared pixel values may be determined to be pixels influenced by the imperfections (hereinafter "defective pixels").

Next, visible light is transmitted through the photographic film. Visible light is influenced by the image on the photographic film, and is scattered by the above imperfections on the photographic film. Thus, regarding the defective pixels, the pixel values (R pixel value, G pixel value and B pixel value) for the respective colors of R (Red), G (Green) and B (Blue) acquired by a scanner or the like reading the light transmitted through the photographic film are lowered to a level similar to the above infrared pixel values.

It is therefore possible to recover faults in the image read due to the above imperfections by adding amounts of reduction of the infrared pixel values as amounts of correction to the R, G and B pixel values regarding the above defective pixels.

However, an image processing using the infrared image data (formed of infrared pixels having the infrared pixel values) is effective for defective pixels influenced by scratches present on the base surface of photographic film, but has difficulties in removing the influence on pixels exerted by scratches present on the emulsion surface (hereinafter "emulsion scratches"). The reason is as follows.

Scratches on the emulsion surface of photographic film refer to a state of an image being damaged by scraping off of coloring matters forming the photographic film. The emulsion surface of film refers to sensitive layers with a red sensitive layer (cyan coloring matter), a green sensitive layer (magenta coloring matter) and a blue sensitive layer (yellow coloring matter) laid successively on the base surface as shown in FIG. 8.

When a scratch is formed on the emulsion surface, as shown in FIG. 8, the layers are scraped off successively from the blue sensitive layer onward, and in varied amounts. Thus, the R, G and B pixel values of pixels influenced by the emulsion scratch (hereinafter called "emulsion scratch pixels") increase by different amounts for the respective color components, compared with a state of being free from emulsion scratches. It is therefore difficult to remove the influence of the emulsion scratch from the emulsion scratch pixels for the R, G and B pixel values by a process of adding the amount of reduction of the infrared pixel value to each.

Thus, the above emulsion scratch pixels require a process different from the process using the infrared pixel values. According to the description in paragraph [0104] of Japanese Unexamined Patent Publication 2001-78038, it is considered preferable to remove the influence of an emulsion scratch by an interpolating process for the pixel values of the above emulsion scratch pixels.

The above interpolating process is intended to remove the influence of the above imperfections by producing corrected R, G and B pixel values of each defective pixel from the R, G and B pixel values of normal pixels (i.e. pixels not influenced by the above imperfections) lying around the defective pixel such as the emulsion scratch pixel. However, although the above interpolating process can reproduce color and density free from defects, an output image will be smoothed with low granularity. That is, the part of the output image corresponding to the above defective pixels has less graininess (noise component) than other parts, so that the part corresponding to the above defective pixels will become conspicuous.

Thus, when an interpolating process is carried out for the above defective pixels, the pixels subjected to the process will stand out in the output image. The output image can hardly be said a corrected image free from the influence of the above imperfections.

SUMMARY OF THE INVENTION

This invention has been made with a view to solving the above problem, and its object is to provide an image processing apparatus, an image processing method, an image processing program and a recording medium having the image processing program recorded thereon, for recovering faults in images due to imperfections on a recording medium by carrying out an interpolating process for defective pixels such as emulsion scratch pixels in a way to render as inconspicuous as possible parts corresponding to the defective pixels.

The above object is fulfilled, according to this invention, by an image processing method for recovering reading faults due to imperfections, comprising:

- a step of detecting defective pixels influenced by the imperfections;
- a step of performing an interpolating process for defective pixels to create corrected pixel values for the defective pixels;
- a step of calculating standard deviations of pixel values forming image data, and determining granularity of the input image based on the standard deviations; and
- a step of adding a value obtained by multiplying the granularity by a random number to the corrected pixel values for each defective pixel.

First, defective pixels influenced by imperfections such as scratches, dust or stains present on the image recording medium are detected from the input image. Since the interpolating process is performed for the defective pixels, corrected pixel values may be created for each defective pixel. Granularity of the above defective pixels is reduced.

Next, standard deviations of pixel values forming the image data are calculated, and granularity of the input image is determined based on the standard deviations. The standard deviations may be considered to be measures of scattering of the pixel values. Granularity in pixels is said to result from the scattering of the pixel values of each pixel belonging to a surrounding area including the above pixel. Thus, the standard deviations of pixel values forming the image data may be considered the granularity.

Then, a value obtained by multiplying the granularity by a random number is added to the corrected pixel values for each defective pixel. That is, since the measure of scattering of the pixel values in the input image is multiplied by a random number for each defective pixel, the scattering, which resembles graininess of the input image, may be given to each defective pixel. As a result, even when an interpolating process is performed for the above defective pixel, a portion corresponding to the defective pixel may be made as inconspicuous as possible.

In a preferred embodiment of this invention, the method further comprises a step of shifting a mask consisting of a reference number of pixels on the input image by a predetermined number of pixels at a time, and calculating standard deviations of pixel values forming image data of each pixel included in the mask in each shift position, and a step of calculating an average of the standard deviations in the mask in each shift position, wherein the average is determined to be the granularity of the input image.

Granularity in a certain pixel is determined by scattering of pixel values of pixels located in an adjacent area including the above pixel. On the other hand, where the input image has many density edges, the standard deviations of the pixel values forming the input image are influenced by the density edges. Therefore, an average of the standard deviations of pixel values of several pixels in the input image is considered closer to the granularity of the input image than the standard deviations of pixel values forming the input image.

Then, according to the above method, a mask consisting of a reference number of pixels on the input image by a predetermined number of pixels at a time, and standard deviations of pixel values included in the mask in each shift position are calculated. That is, standard deviations of pixel values are determined in units of several pixels.

Furthermore, an average of the standard deviations in the mask in each shift position is calculated, and the average is determined to be the granularity of the input image. In this way, a value closer to the granularity of the input image may be obtained than where simply the standard deviations of pixel values forming the input image are determined as the granularity of the input image.

In a further preferred embodiment of this invention, the mask is shifted in a way to avoid duplication of pixels in each shift position. According to this method, with the mask shifted in a way to avoid duplication of pixels in each shift position, the number of times the mask is shifted may be reduced to increase processing speed.

In a further preferred embodiment of this invention, the standard deviations are calculated by excluding pixel values of the defective pixels. The pixel values of the defective pixels are abnormal data. By excluding such data in calculating the standard deviations, the standard deviations of pixel values forming input image data may be obtained with increased accuracy.

In a further preferred embodiment of this invention, the random number is generated in a range of −0.5 to +0.5. When positive pixel values scattered in the range of standard deviations to a certain pixel group (subset image data), the pixel values become high on average and the original density of the whole image will be lost. Therefore, in order to add graininess to a certain pixel group, without changing the average of pixel values, it is necessary to add the pixel values scattered in a range of standard deviations with 0 as the median (i.e. −standard deviation to +standard deviation) to the pixel group.

On the other hand, the standard deviations obtained from the pixel group are influenced not only by the granularity of the image but also by density edges in the image. Thus, when standard deviations of pixels scattered in the range of ±standard deviations are added to a certain pixel group, the result is an addition of granularity stronger than the original granularity of the input image. Therefore, in order to add the original granularity of the input image, it is necessary to adjust scattering of the pixels to be added. Since an experientially desirable range of scattering of pixels to be added is ±standard deviations, the above random number is generated in the range of −0.5 to +0.5. Then, the original granularity of the input image may be added.

Preferably, the image recording medium used in this invention is photographic film. This is because the above graininess adding process is necessary for removing the influence of the above imperfections from image data acquired from photographic film, in which case an interpolating process is often carried out.

This invention is advantageous particularly where the imperfections are scratches formed on an emulsion surface of the photographic film. For removing the influence of scratches formed on the emulsion surface of photographic film, an image processing based on infrared image data has difficulties, and an interpolating process is essential. Thus, the above graininess adding process is important for pixels influenced by scratches formed on the emulsion surface.

The foregoing object is fulfilled, according to another aspect of the invention, by an image processing apparatus for recovering reading faults due to imperfections, comprising:

a defective pixel detecting unit for detecting defective pixels influenced by the imperfections;

an interpolating unit for performing an interpolating process for the defective pixels to create corrected pixel values for the defective pixels;

a standard deviation calculating unit for calculating standard deviations of pixel values forming image data, and determining granularity of an input image based on the standard deviations; and a graininess adding unit for adding a value obtained by multiplying the granularity by a random number to the corrected pixel values for each defective pixel.

It will be clear that, with the above construction, this image correcting apparatus provides the same advantages as the image processing method described hereinbefore.

The foregoing object may be fulfilled also by a construction that detects defective pixels influenced by the above imperfections from input image data, performs an interpolating process for the above defective pixels to create corrected pixel values of the defective pixels, calculates a distribution of pixel values forming the image data, determines granularity of the input image based on the distribution, and adds a value obtained by multiplying the granularity by a random number for each defective pixel to the corrected pixel values.

Finally, it is to be noted that this invention is directed also to an image processing program serving as a core element for realizing the foregoing image correcting method and image correcting apparatus, and to recording media storing this image processing program. The image processing program may be installed in an ordinary computer through the above recording media or a network. Then, the computer may be used to realize the above image processing method. In other words, this computer may be operated as the image processing apparatus.

Other features and advantages of this invention will be apparent from the following description of the embodiment to be taken with reference to the drawings.

DESCRIPTION OF THE PREFERRED EMBODIMENTS

This invention relates to an image processing for recovering reading faults in digital image data (hereinafter called "image data") derived from an image recording medium, due to imperfections such as scratches, dust, stains and the like present on the image recording medium. An image processing method and an image processing apparatus embodying this invention will be described hereinafter, for removing the influence of emulsion scratches on photographic film from image data derived from the photographic film serving as an image recording medium.

Figure 1:
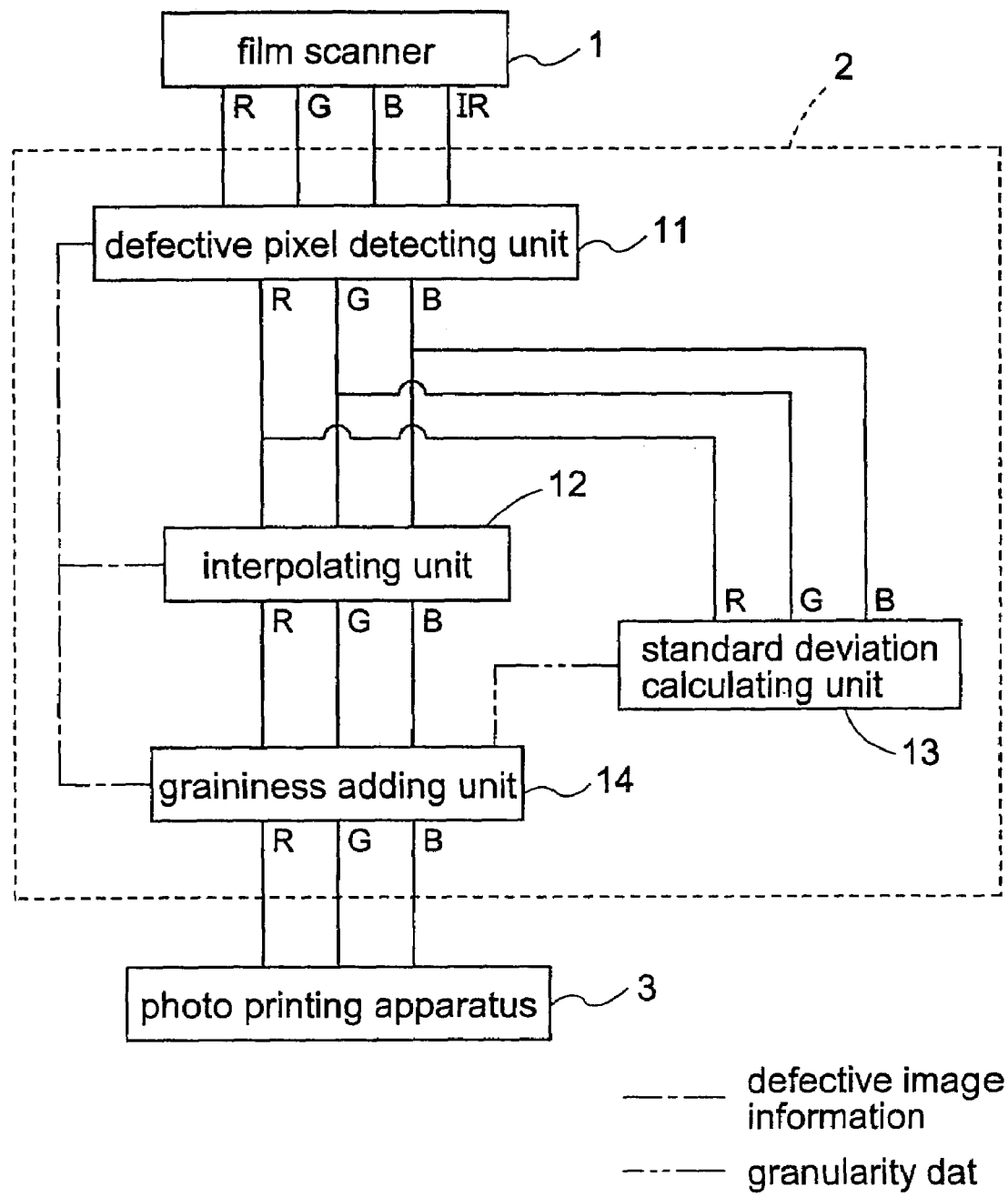
FIG. 1 is a block diagram showing an outline of a photo processing system according to this invention.

One embodiment of this invention will be described with reference to the drawings. FIG. 1 is a block diagram showing an outline of an image output system in this embodiment. The image output system includes a film scanner 1, an image processing apparatus 2 and a photo printing apparatus 3.

The film scanner 1 emits light from a light source to negative film which is a photographic film and receives transmitted light with a CCD (Charge Coupled Device) to read R, G, B analog signals of an input image recorded on the negative film. Furthermore, the film scanner 1 changes the R, G, B analog signals into R, G, B image data (digital data). This image data is outputted to the image processing apparatus 2.

The film scanner 1 emits also infrared light to the above negative film and receives transmitted light with the CCD (Charge Coupled Device) to read infrared analog signals from the input image recorded on the negative film. Furthermore, the film scanner 1 changes the infrared analog signals into infrared image data (IR, digital data), and transmits the infrared image data to the image processing apparatus 2.

The image processing apparatus 2 is a block that realizes an image processing for removing the influence of emulsion scratches present on the photographic film by carrying out an arithmetic processing of R, G, B pixel values included in the image data inputted, and infrared pixel values included in the infrared image data inputted. The image processing apparatus 2 outputs recovered image data obtained by the above image processing to the photo printing apparatus 3.

The image processing apparatus 2 is in the form of a PC (Personal Computer)-based apparatus, for example, and includes a main PC body, a display device such as a monitor, and input devices such as a keyboard and a mouse, not shown. This image processing apparatus 2 will be described in detail hereinafter.

The photo printing apparatus 3 prints images on printing paper acting as a sensitive material, by exposing the printing paper according to the R, G, B image data resulting from the above image processing by the image processing apparatus 2. A head used for emitting light according to the above image data to the printing paper is in the form of an optical modulator that can modulate irradiating light to the printing paper for every pixel according to the above image data.

Such optical modulators include, for example, a PLZT exposure head, a DMD (Digital Micromirror Device), an LCD (Liquid Crystal Display), a Light Emitting Diode (Light Emitting Diode) panel, a laser, an FOCRT (Fiber Optic Cathode Ray Tube), and CRT (Cathode Ray Tube).

The photo printing apparatus 3 may be constructed as an auto printer capable of both scanning of negative film and exposure of printing paper. In this case, the image output system may be simplified by connecting the image processing apparatus 2 formed of a PC (Personal Computer) or the like to the auto printer having functions from reading to printing of images.

Next, the image processing apparatus 2 will be described in detail. As shown in FIG. 1, the image processing apparatus 2 includes a defective pixel detecting unit 11, an interpolating unit 12, a standard deviation calculating unit 13 and a graininess adding unit 14.

The defective pixel detecting unit 11 is a block for receiving the image data including the R, G, B pixel values and the infrared image data including the infrared pixel values from the film scanner 1, and detecting emulsion scratch pixels with high precision from all the pixels forming the input image. The defective pixel detecting unit 11 outputs the R, G, B pixel values to the interpolating unit 12 and standard deviation calculating unit 13, and outputs defective pixel information indicating positions of the emulsion scratch pixels to the interpolating unit 12 and graininess adding unit 14.

A technique used herein for detecting emulsion scratches is one described in Japanese Patent Application No. 2002-295330 in the name of the applicant of this invention. An outline of the principle of this technique will be described hereinafter.

The interpolating unit 12 is a block for performing an interpolating process only for the emulsion scratch pixels based on the R, G, B pixel values and the defective pixel information received from the defective pixel detecting unit 11, to create corrected pixel values of each emulsion scratch pixel. The interpolating unit 12 outputs the R, G, B pixel values (including the corrected pixel values) to the graininess adding unit 14.

The above interpolating process is a process for creating corrected pixel values from pixel values of lattice point pixels which are normal pixels lying around each emulsion scratch pixel, and applying the corrected pixel values as data of the emulsion scratch pixel interpolated. The above interpolating process may employ the procedure described in paragraphs [0117] to [0135] of Japanese Unexamined Patent Publication 2001-78038 noted hereinbefore.

The standard deviation calculating unit 13 is a block for calculating standard deviations based on the R, G, B pixel values received from the defective pixel detecting unit 11, and determines the standard deviations to be the granularity of the input image. The standard deviation calculating unit 13 outputs granularity data indicating the granularity determined to the graininess adding unit 14.

The graininess adding unit 14 is a block for realizing a graininess adding process for each emulsion scratch pixel based on the pixel values included in the R, G, B image data received from the interpolating unit 12, defective pixel information received from the defective pixel detecting unit 11, and the granularity data received from the standard deviation calculating unit 13. The graininess adding process is a process for adding a value obtained by multiplying the above granularity by a random number to the above corrected pixel values for each emulsion scratch pixel. A method of determining granularity in the standard deviation calculating unit 13 and the graininess adding process in the graininess adding unit 14 will be described in detail hereinafter.

The graininess adding unit 14 outputs R, G, B image data after the graininess adding process to the photo printing apparatus 3.

Figure 3:
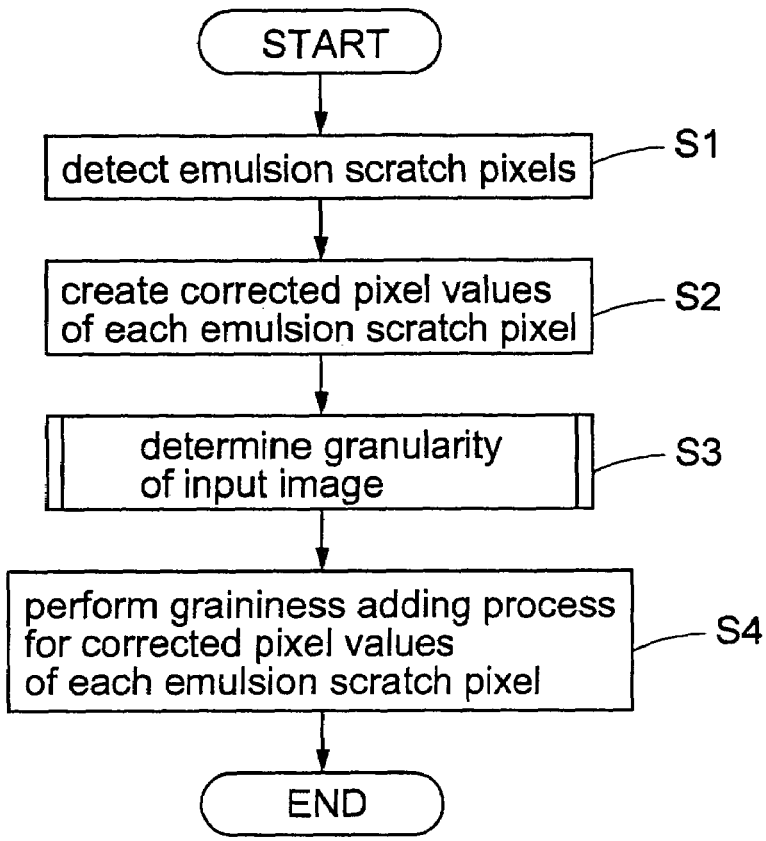
FIG. 3 is a flow chart showing a process performed by an image processing apparatus forming part of the photo processing system.
Figure 5:
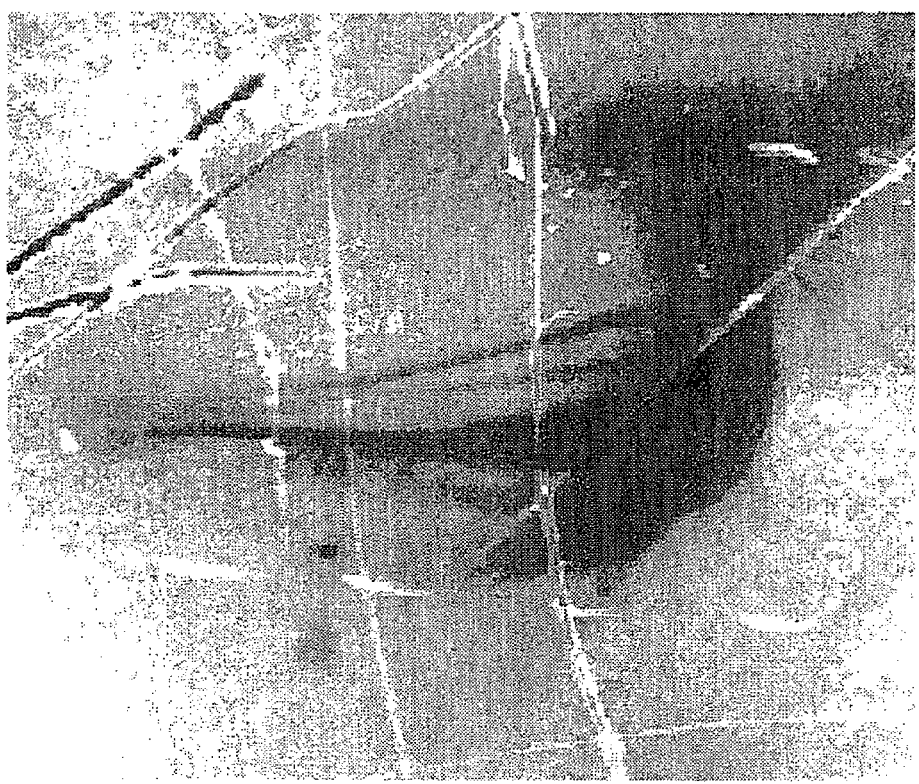
FIG. 5 is a view showing a sample image captured from photographic film having emulsion scratches.

Next, a processing sequence of the image processing apparatus 2 will be described with reference to FIG. 3. First, the defective pixel detecting unit 11 detects emulsion scratch pixels from all the pixels forming the input image, based on the R, G, B image data and infrared image data received from the film scanner 1 (S1). FIG. 5 shows a sample image captured from a photographic film having emulsion scratches.

Figure 6:
FIG. 6 is a view showing a sample image obtained by performing an interpolating process for the sample image of FIG. 5.

Further, the interpolating unit 12 performs an interpolating process only for the above emulsion scratch pixels based on the R, G, B image data and defective pixel information received from the defective pixel detecting unit 11 (S2). This creates corrected pixel values of each emulsion scratch pixel. FIG. 6 shows a sample image obtained by performing the interpolating process for the sample image of FIG. 5.

Figure 7:
FIG. 7 is a view showing a sample image obtained by performing a graininess adding process for the sample image of FIG. 6.
Figure 8:
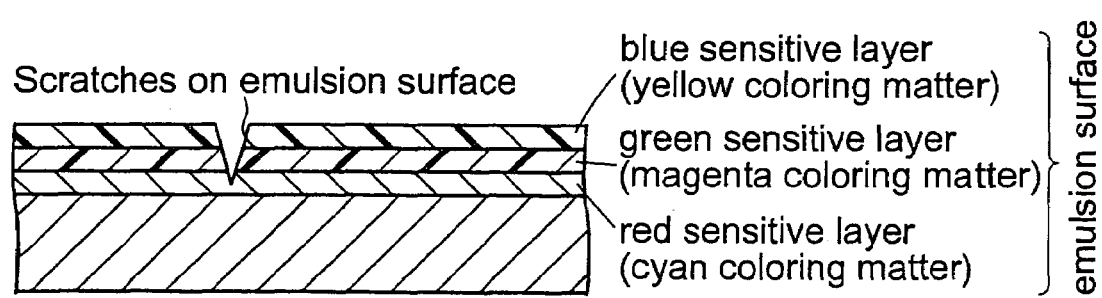
FIG. 8 is a sectional view showing a photographic film.

The standard deviation calculating unit 13 calculates standard deviations of the pixel values, and determines the above standard deviations as the granularity of the input image (S3). Subsequently, the graininess adding unit 14 performs a graininess adding process based on the pixel values included in the R, G, B image data, the defective pixel information, and the granularity data indicating the granularity of the input image (S4). FIG. 7 shows a sample image obtained by performing the graininess adding process for the sample image of FIG. 6. The graininess adding unit 14 outputs the R, G, B image data after the graininess adding process to the photo printing apparatus 3. The photo printing apparatus 3 prints the image on printing paper based on the R, G, B image data after the graininess adding process.

The process performed by the defective pixel detecting unit 11 for detecting the emulsion scratch pixels (S1) will be described in detail hereinafter.

<Process for Detecting Emulsion Scratch Pixels>

First, the defective pixel detecting unit 11 solves equations (1) and (2) for each pixel forming the input image to obtain CF values of the input image:

$$\text{First variable } X = R\text{datk},1 - IR\text{datk},1 + IR\text{avek},1 \quad (1)$$

$$\text{Second variable } Y = R\text{datk},1 \quad (2)$$

where
Rdatk,1: R pixel value of each pixel in the input image,
IRdatk,1: IR pixel value of each pixel in the input image, and
IRavek,1: average of IR pixel values of pixels in the input image Furthermore, the defective pixel detecting unit 11 performs a regression calculation of equation (3) using the first variable X and second variable Y derived from the equations (1) and (2).

$$\text{primary regression } Y = \alpha X + \beta \quad (3)$$

Here, the equation (3) will be described. As noted in the description of the prior art hereof, infrared pixel values are influenced by the above defects, and not by an image on photographic film. Then, when IRavek,1 in equation (1) is regarded as an infrared pixel value of a normal pixel, (−IRdatk,1+IRavek,1) may be considered an amount of reduction of the infrared pixel value from a state without a defect of the above defective pixel. Therefore, intercept beta in equation (3) may be considered an average of amounts of reduction of infrared pixel values from a state without a defect of defective pixels.

Next, the defective pixel detecting unit 11 solves equation (4):

$$CF\ value = IRavek, 1 + \beta \qquad (4)$$

CF value means an infrared pixel value taken in from a photographic film having no defect. Equation (4) is established because an average of infrared pixel values is reduced by the above defect, and a difference between CF value and the average of infrared pixel values may be considered an average amount of reduction of the infrared pixel values from a state without a defect of defective pixels. Therefore, CF value derived as above may be considered an infrared pixel value of the above normal pixel.

Further, the defective pixel detecting unit 11 detects emulsion scratch pixels after obtaining the CF value as noted above. An infrared pixel value of each emulsion scratch pixel is less by a predetermined amount than an average infrared pixel value of normal pixels located in a predetermined range (e.g. 7×7 pixels) around the above emulsion scratch pixel. This is because infrared light is scattered also by an emulsion scratch. Therefore, a mask consisting of a reference number of pixels (7×7 pixels) may be set to the input image, and conditions may be set for determining a center pixel satisfying equation (5) shown below to be an emulsion scratch pixel. The defective pixel detecting unit 11 detects pixels with infrared pixel values equal to or exceeding the CF value to be normal pixels. Since the CF value is an infrared pixel value where the photographic film has no defect, pixels with infrared pixel values equal to or exceeding the CF value may be regarded as normal pixels.

$$IRdatm, n < IRavem, n - \text{first predetermined amount} \qquad (5)$$

where
IRdatm,n: infrared pixel value of the center pixel in the mask, and
IRavem,n: average of infrared pixel values of normal pixels in the mask.

On the other hand, an emulsion scratch means a scratch produced by deficiency of a coloring layer of each color component on the emulsion surface of photographic film. Thus, when light is emitted to an emulsion scratch on photographic film, a deficient part does not absorb the light whereby a greater quantity of light is transmitted than where there is no emulsion scratch. That is, in emulsion scratch pixels, an average Ddat of pixel values of the color components is greater than where there is no emulsion scratch. The average Ddat of pixel values of the color components may be derived from equation (6).

$$Ddat = (R + G + B)/3 \qquad (6)$$

where
R: pixel value of R,
G: pixel value of G, and
B: pixel value of B.

In the film scanner 1, the analog signals of the input image are changed into image data (digital data) by being sampled and quantized. In an image reproduced from the above image data, therefore, numerous pixels share information on the same pattern. Supposing that all the pixels are normal pixels in a predetermined area centering on a certain pixel, Ddat of each pixel in the predetermined area is considered almost uniform. That is, when a mask of a predetermined number of pixels is set to the input image around an emulsion scratch pixel, the average Ddat of the normal pixels located in the above mask may be considered Ddat where the above emulsion scratch pixel has no emulsion scratch. Further, considering also that the emulsion scratch pixel has a greater average Ddat of pixel values of the color components than where there is no emulsion scratch, the Ddat of the emulsion scratch pixel is considered higher by a predetermined amount than an average Ddat of the surrounding normal pixels. Thus, by setting a mask consisting of a reference number of pixels (7×7 pixels) to the input image, a center pixel satisfying the condition shown in equation (7) may be considered an emulsion scratch pixel among the pixels within the above mask.

$$Ddatm, n > Davem, n + \text{second predetermined amount} \qquad (7)$$

where
Ddatm,n: Ddat of the center pixel in the mask, and
Davem,n: average Ddat of the normal pixels in the mask.

Emulsion scratch pixels may be distinguished with high precision by combining the conditions of equations (5) and (7). Thus, the defective pixel detecting unit 11 detects pixels satisfying the conditions of equations (5) and (7) as emulsion scratch pixels from among the pixels in the input image. The method of detecting emulsion scratch pixels used herein corresponds to a portion of the procedure described in Japanese Patent Application 2002-295330, but is not limited to this procedure. A different procedure for detecting emulsion scratch pixels may be employed, such as that described in paragraphs [0098] to [0105] of Japanese Unexamined Patent Publication 2001-78038.

Figure 4:
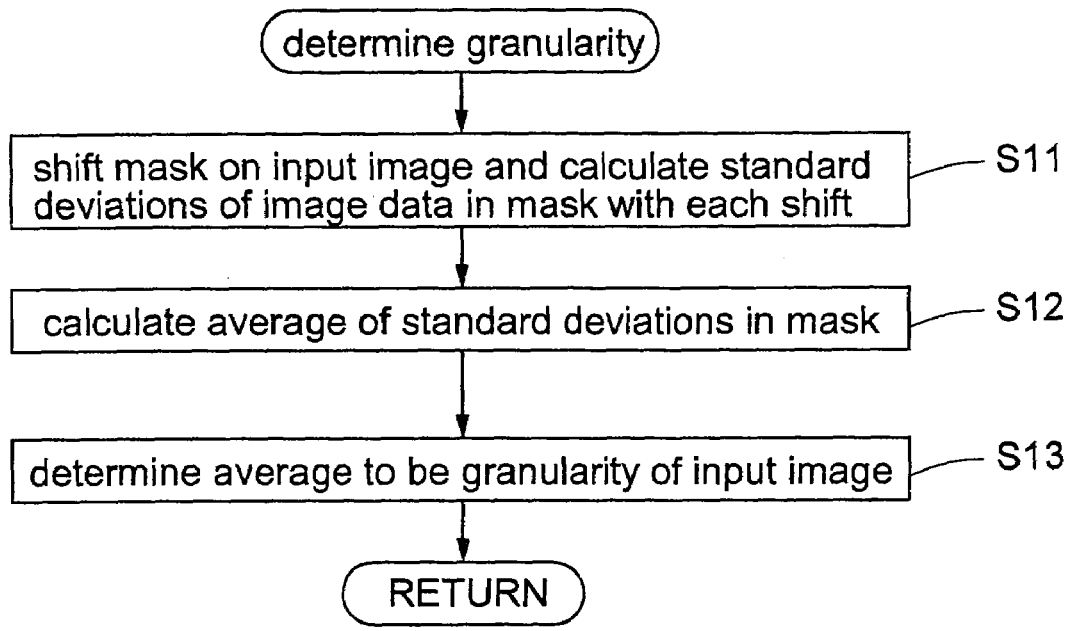
FIG. 4 is a flow chart showing a process performed in a standard deviation calculating unit forming part of the image processing apparatus.

Next, a procedure for determining granularity of the input image performed by the standard deviation calculating unit 13 will be described with reference to the flow chart of FIG. 4.

<Method of Determining Granularity and Graininess Adding Process>

Figure 2A:
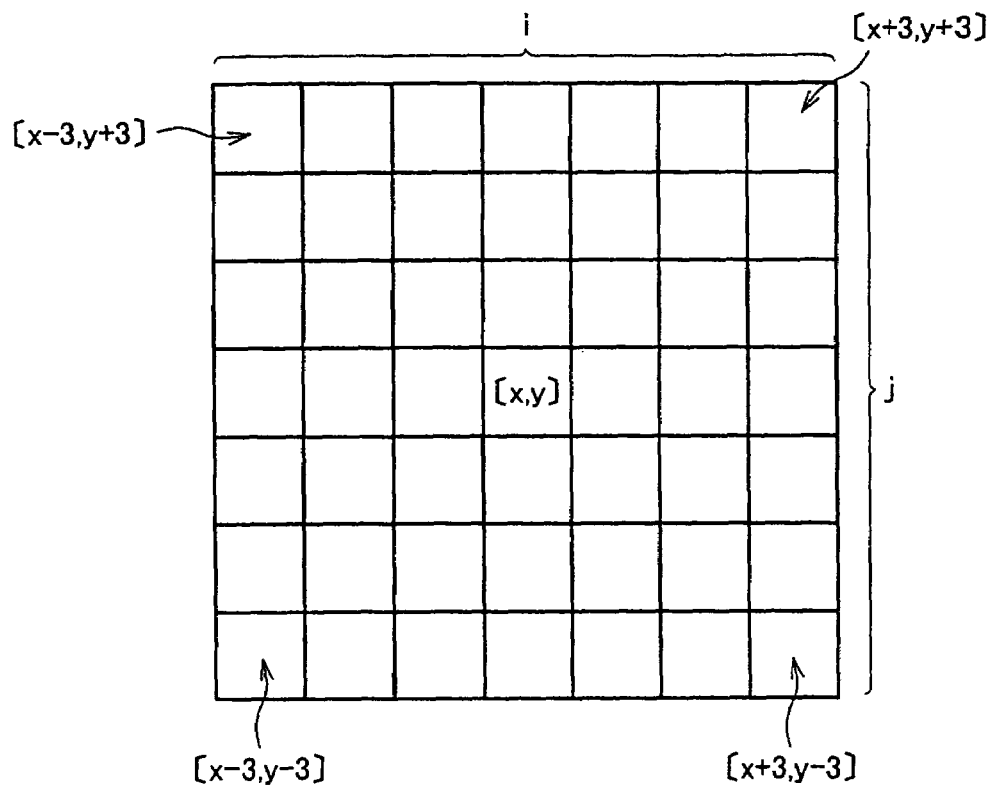
FIG. 2a is a schematic view showing a mask set to an input image.
Figure 2B:
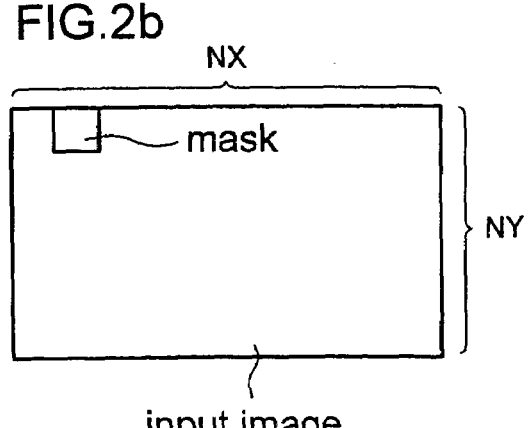
FIG. 2b is an explanatory view showing a relationship between the input image and the mask.
Figure 2C:
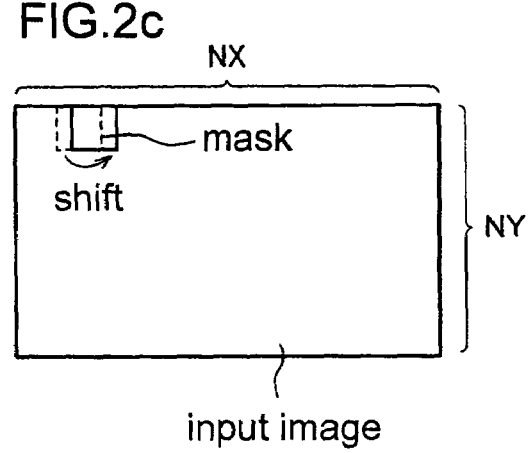
FIG. 2c is an explanatory view showing the mask shifted pixel by pixel.

First, as shown in FIG. 2b, the standard deviation calculating unit 13 sets a mask consisting of the reference number of pixels (7×7 pixels) to the input image. As shown in FIG. 2c, the standard deviation calculating unit 13 shifts the above mask pixel by pixel on the input image, and calculates standard deviations of pixel values of a pixel included in the mask in each shift position (S11). The shifting and the calculation of standard deviations are repeated until the mask passes through all the pixels in the input image.

Equation 1 below shows an operation for calculating standard deviations of pixel values of the pixels included in the above mask. FIG. 2a shows a schematic view of the above mask. While only the R pixel values will be described hereinafter for expediency, the same process is carried out for the G, B pixel values also.

$$Rave_{x,y} = \frac{\sum_{i=-3}^{3} \sum_{j=-3}^{3} Rdat_{x+i, y+j}}{n} \qquad [\text{Equation 1}]$$

$$Rsd_{x,y} = \sqrt{\frac{\sum_{i=-3}^{3} \sum_{j=-3}^{3} (Rave_{x,y} - Rdat_{x+i, y+j})^2}{n}}$$

※ $x = 1 \sim NX,\ y = 1 \sim NY$

Rave x,y: average of R pixel values of pixels in mask
Rsd x,y: standard deviations of pixel values of pixels in mask
Rdat x+i,y+j: R pixel values of pixels in mask NX: number of pixels in horizontal direction of input image
NY: number of pixels in vertical direction of input image
n: number of pixels in mask In Equation 1, the equation for deriving Rsdx,y has denominator n. The denominator may be (n−1), instead.

In calculating standard deviations of pixel values of each pixel included in the mask, it is desirable to exclude the pixel values of emulsion scratch pixels. This is done in order to calculate standard deviations accurately in a state where there is no emulsion scratch in the input image, by excluding emulsion scratch pixels, since the pixel values of the emulsion scratch pixels are abnormal data. When more than half of the pixels are emulsion scratch pixels (i.e. more than 24 emulsion scratch pixels) in the mask in a certain shift position, the standard deviations of the pixel values of each pixel included in the mask in that shift position are regarded as invalid, and are not used in subsequent processes. This is because a small number of data renders the standard deviations obtained low in reliability.

Figure 2D:
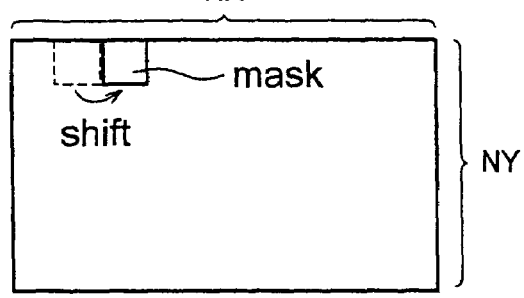
FIG. 2d is an explanatory view showing the mask shifted by seven pixels at a time.

Further, the mask may be shifted by at least one pixel each time, and may be shifted by any number of pixels at a time. As shown in FIG. 2d, for example, the mask may be shifted every seven pixels to avoid duplication of the pixels in each shift position. By shifting the mask in this way, the mask may be shifted a reduced number of times to increase processing speed. The reference number of pixels for the mask is not limited to 7×7 pixels but is variable. In the case of 8×8 pixels, for example, the mask may be shifted a less number of times than the case of 7×7 pixels to increase processing speed.

Furthermore, the standard deviation calculating unit 13 calculates an average of standard deviations of the mask in each shift position (S12). Equation 2 below shows an operation for calculating the above average. When the pixel values of the emulsion scratch pixel are excluded from Equation 1 in calculating standard deviations, the standard deviations made invalid are not used in the operation to obtain the above average.

$$Rgd = \frac{\sum_{x=1}^{NX} \sum_{y=1}^{NY} Rsd_{x,y}}{m}$$ [Equation 2]

Rgd: average of standard deviations (granularity)
m: number of standard deviations The standard deviation calculating unit 13 determines the above average to be the granularity of the input image (S13). Further, the standard deviation calculating unit 13 outputs granularity data showing the granularity determined to the graininess adding unit 14.

The reason for regarding the average of standard deviations obtained from the mask in each shift position as the granularity of the input image will be described hereinafter.

Essentially, the standard deviations obtained from the pixel values of each pixel in the input image are greatly influenced by variations in the density of the input image. Thus, where the photographic subject in the input image has many physical outlines (density edges), the standard deviations obtained from the pixel values of each pixel in the input image could disagree with the granularity of the input image.

On the other hand, granularity in a certain pixel is determined by scattering (standard deviations) of pixel values of pixels located in an adjacent area including the above pixel. Therefore, an average of the standard deviations of pixel values of several pixels in the input image is less likely to be influenced by the density edges, and is considered closer to the granularity of the input image, than the standard deviations of pixel values of the pixels in the input image. Experientially also, it is desirable to regard the above average as the granularity of the input image. Thus, as noted above, the standard deviation calculating unit 13 determines an average of standard deviations obtained from the mask in each shift position to be the granularity of the input image.

However, where the input image has relatively few physical outlines of the photographic subject, the standard deviations obtained from the pixels in the input image may be regarded as the granularity of the input image. Thus, step S13 may be made a procedure for determining the standard deviations of the pixels in the input image to be the granularity of the input image.

The graininess adding unit 14 having received the above granularity data performs a graininess adding process for each emulsion scratch pixel based on Equation 3.

$$Rdat'_{a,b} = Rdat_{a,b} + Rgd \times Rrnd$$ [Equation 3]

[a,b]: coordinates of emulsion scratch pixel
Rdat'a,b: R pixel values after graininess adding process
Rdat a,b: R pixel values before graininess adding process (corrected pixel values)
Rrnd: random number of −0.5 to +0.5

As described above, the standard deviation calculating unit 13 calculates standard deviations of pixel values, and determines the granularity of the input image based on the standard deviations. The standard deviations may be considered to be measures of scattering of the pixel values. Since granularity in pixels is said to result from the scattering of the pixel values of each pixel belonging to the surrounding area including the above pixel, the standard deviations may be considered the granularity of the input image.

The graininess adding unit 14 adds a value obtained by multiplying the above granularity by a random number to the above corrected pixel values of each emulsion scratch pixel. That is, since the measure of scattering of the pixel values in the input image is multiplied by a random number for each emulsion scratch pixel, the scattering that resembles graininess of the input image may be given to each emulsion scratch pixel. As a result, even when an interpolating process is performed for the above emulsion scratch pixel, a portion corresponding to the emulsion scratch pixel may be made as inconspicuous as possible.

In this embodiment, the above random number is generated in the range of +0.5 to −0.5. The reason is as follows. When positive data scattered in the range of standard deviations σ to a certain pixel group, the pixel values become high on average and the original density of the whole image will be lost. Therefore, in order to add graininess to a certain pixel group, without changing the average of pixel values, it is necessary to add the pixel values of pixels scattered in a range of standard deviations σ with 0 as the median (i.e. −σ to +σ) to the pixel group.

On the other hand, the standard deviations obtained from the pixel group are influenced not only by the granularity of the image but somewhat also by density edges in the image. Thus, when data scattered in the range of ±σ is added to a certain pixel group, the result is an addition of granularity stronger than the original granularity of the input image. Therefore, in order to add the original granularity of the input image, it is necessary to adjust scattering of the data to be added. Since the experientially desirable range of scattering of data to be added is ±σ, the above random number is generated in the range of −0.5 to +0.5. However, the range of the random number is not limited to the range of −0.5 to +0.5, but is variable as appropriate according to the performance of the photo processing system.

In this embodiment, standard deviations of pixel values are calculated, and the granularity of the input image is determined based on the standard deviations. The granularity of the input image may be determined based on a distribution of the pixel values (square of standard deviation) instead of the standard deviations. Since the distribution is a square of standard deviations, it is possible to secure a larger range of granularity to be added by using the distribution than by using the standard deviations. Further, when the granularity to be added becomes too strong by using the distribution, the granularity may be adjusted by reducing the random number generating range for the graininess adding process.

Further, where the granularity of the input image is determined based on the distribution, step S11 becomes a procedure for calculating a distribution of pixel values of each pixel included in the mask in each shift position. Step S12 becomes a procedure for calculating an average of distributions in the mask in each shift position. Furthermore, step S13 becomes a procedure for determining the average of the distributions as the granularity of the input image. Step S13 may be made a procedure for determining a distribution of pixels in the input image as the granularity of the input image.

In this embodiment, the above graininess adding process is performed only for the emulsion scratch pixels, but the invention is not limited thereto. The graininess adding process is effective for all the defective pixels subjected to the interpolating process. For example, the defective pixel detecting unit 11 may regards pixels having infrared image data lower than the above CF value by a predetermined amount as defective pixels (pixel influenced by scratches, dust or stains). Then, the interpolating unit 12 may perform the interpolating process for such defective pixel, and the graininess adding unit 14 may perform the graininess adding process for these defective pixels.

Furthermore, in this embodiment, the photo processing system performs the above graininess adding process for image data read from photographic film. However, a copying machine may also perform the graininess adding process for image data taken in from image recording media (e.g. paper, OHP sheets and so on).

The processes described in the above embodiment may be realized by a program. This program is stored in a recording medium readable by computers. In this invention, such recording medium may be a memory (e.g. the ROM itself), not shown, required for the processes performed by the image processing apparatus 2, or a program medium insertable into and readable by a program reading device provided as an external storage device not shown.

In any case, the program stored may be accessed and performed by a microprocessor (not shown). The program stored may be performed after being read and downloaded into a program storage area not shown. In this case, a downloading program is stored in the main apparatus in advance.

The above program medium is a recording medium removable from the main apparatus, and may be the tape type such as magnetic tape or cassette tape, the disk type such as magnetic disks including a floppy (registered trademark) disk and hard disk, or optical disks including as a CD-ROM, MO, MD and DVD, the card type such as an IC card (including a memory card), or an optical card, or media including semiconductor memory for storing a program in a fixed way such as a mask ROM, EPROM or flash ROM.

Finally, the foregoing embodiment is not intended to limit the scope of this invention, but is variable in many ways within the scope of the invention.

What is claimed is:

1. An image processing method for recovering reading faults from digitized image data of an input image read from an image recording medium, the faults being due to imperfections present on the image recording medium, said method comprising the steps of:
   detecting defective pixels influenced by said imperfections;
   performing an interpolating process for said defective pixels to create corrected pixel values for said defective pixels;
   calculating standard deviations of pixel values forming the image data, and determining granularity of said input image based on said standard deviations; and
   adding a value obtained by multiplying said granularity by a random number to said corrected pixel values for each defective pixel.

2. A method of claim 1, further comprising the steps of:
   shifting a mask consisting of a reference number of pixels on the input image by a predetermined number of pixels at a time and calculating standard deviations of pixel values forming image data of each pixel included in said mask in each shift position; and
   calculating an average of said standard deviations in said mask in each shift position; and
   wherein said average is determined to be the granularity of said input image.

3. A method of claim 2, wherein the step of shifting shifts said mask in a way to avoid duplication of pixels in each shift position.

4. A method of claim 1, wherein the step of calculating calculates said standard deviations by excluding pixel values of the defective pixels.

5. A method of claim 1, further comprising the step of generating said random number in a range of −0.5 to +0.5.

6. A method of claim 1, wherein said image recording medium is a photographic film; and wherein the step of detecting detects defective pixels influenced by said imperfection present in said photographic films.

7. A method of claim 6, wherein said imperfections are scratches formed on an emulsion surface of said photographic film; and wherein the step of detecting detects defective defects pixels influenced by said scratches.

8. A computer-readable medium comprising computer-executable instructions for recovering reading faults from digitized image data of an input image read from an image recording medium, the faults being due to imperfections present on the image recording medium, said computer-executable instructions for:
   detecting defective pixels influenced by said imperfections;
   performing an interpolating process for said defective pixels to create corrected pixel values for said defective pixels;
   calculating standard deviations of pixel values forming the image data, and determining granularity of said input image based on said standard deviations; and
   adding a value obtained by multiplying said granularity by a random number to said corrected pixel values for each defective pixel.

9. A computer-readable medium of claim 8, wherein said computer-executable instructions further comprises instructions for shifting a mask consisting of a reference number of pixels on the input image by a predetermined number of pixels at a time, and calculating standard deviations of pixel values forming image data of each pixel included in said mask in each shift position, and calculating an average of said standard deviations in said mask in each shift position; and wherein said average is determined to be the granularity of said input image.

10. An image processing apparatus for recovering reading faults produced in time of scanning photographic film due to imperfections present on the film, said apparatus comprising:

a defective pixel detecting unit for detecting defective pixels influenced by said imperfections;

an interpolating unit for performing an interpolating process for said defective pixels to create corrected pixel values for said defective pixels;

a standard deviation calculating unit for calculating standard deviations of pixel values forming image data, and determining granularity of an input image based on said standard deviations; and a graininess adding unit for adding a value obtained by multiplying said granularity by a random number to said corrected pixel values for each defective pixel.

\* \* \* \* \*